United States Patent Office 3,509,089
Patented Apr. 28, 1970

3,509,089
DENTAL CEMENT OR TEMPORARY FILLING COMPOSITION UTILIZING ZINC OXIDE PARTICLES COATED WITH ZINC PROPIONATE
Emery W. Dougherty, Milford, Del., assignor to Dentsply International Inc., York, Pa., a corporation of Delaware
No Drawing. Continuation-in-part of application Ser. No. 546,215, Apr. 29, 1966. This application Nov. 18, 1968, Ser. No. 776,803
Int. Cl. C08f 45/04
U.S. Cl. 260—41                  3 Claims

ABSTRACT OF THE DISCLOSURE

A temporary dental filling or dental cement composition which comprises a dispersed mixture of (a) liquid eugenol and (b) a finely divided powder comprising zinc oxide, pretreated with propionic acid to form a layer of zinc propionate on the particles, and a polymeric material said polymeric material comprising from about 5.0 to about 75.0% by weight of the finely divided powder selected from polyolefins, polyacrylates, and polymethacrylates, the finely divided powder being employed in amount of from about 1 to 8 grams per 1 cc. of eugenol. Such temporary dental cements or temporary dental fillings are prepared by forming a dispersed mixture of the powders, i.e., zinc oxide and polymeric material, and mixing such mixture of powders with the liquid eugenol.

---

This application is a continuation-in-part of co-pending application Ser. No. 546,215 filed Apr. 29, 1966 and now abandoned.

The present invention relates to cementitious preparations and their production and more particularly to cementitious preparations useful as temporary cements and temporary filling materials in the dental industry.

It is well known that mixtures of zinc oxide and eugenol can be conveniently employed as anti-bacterial agents in the treatment of carious lesions and as palliatives, and with modifiers as an impression compound and as a surgical cement. These mixtures consist essentially of a finely divided zinc oxide and eugenol which react to form the chelated salt, zinc eugenolate, and harden as a result. A stoichiometric excess of zinc oxide is usually employed, and it has been shown that in certain instances excess zinc oxide, unreacted eugenol, and zinc eugenolate exist within the rigid mass of a suitable reaction product.

The reaction by which the zinc eugenolate is formed proceeds very slowly in the oral environment, however, and may take many hours to advance to such a degree that the mixture hardens. However, this hardening reaction may be accelerated by the use of zinc acetate or other well known catalysts. The particle size of the zinc oxide employed is of some importance in determining the reaction velocity and is used in practice to regulate the rate at which the dental material hardens.

However, regardless of what means the reaction is regulated, a maximum compressive strength of between 2,000 and 3,400 p.s.i. is obtained; this is especially true when the compound has been stored in water at 37° C. for one week as in a standard American Dental Association test. The material produced is relatively insoluble in the oral fluids, but it is brittle and lacks sufficient resistance to the disintegrating forces of mastication and the oral environment to be employed as a permanent filling material. It is similarly lacking in sufficient strength to be employed in permanent cementation procedures.

Various attempts to modify the zinc oxide and eugenol mixture so as to compensate for the inherent deficiencies of such compositions, have not been successful. Thus, for example, it has been proposed to modify the mixture in such a way that a second reaction proceeds in competition to the one in which zinc eugenolate is formed. Such a proposed modification is shown in U.S. Patent 2,936,242. Substituted benzoic acids, for example, have been shown to react with zinc oxide and to produce mixtures which may exhibit greater compressive strength than zinc oxide and eugenol alone. However, these mixtures of zinc oxide and the eugenol and substituted benzoic acid, e.g., o-ethoxy benzoic acid are quite deficient in the very essential properties of resistance to extraction by water and the oral fluids. In many cases, the solubility of the mixture can increase to as much as 6 or 7%, obviously an intolerable solubility.

Furthermore, it has been proposed in certain dental literature to incorporate a polymer such as polystyrene into the zinc oxide and eugenol mixture by first dissolving the polymer in the eugenol component, and then mixing this viscous solution with the zinc oxide. Mixtures of zinc oxide with solutions of polymers in eugenol, however, are quite limited. Such a procedure requires that only low molecular weight polymers be employed, otherwise the concentration of polymer possible in the final mass is too greatly reduced because of the limiting effect of the high viscosity of solutions of polymer in the eugenol. Therefore, it is very difficult to mix polymer-eugenol solutions of greater than 1,000 or 2,000 centipoises with finely subdivided zinc oxide. Thus, poor mixing and placement procedures must be endured in order to obtain only slight improvement in properties. It is reported (J. J. Messing, Brit. D. J., 110, 95 (1961)) that an optimum of 10% of polystyrene based on the eugenol can be employed by the incorporation of the polymer into the eugenol solution prior to admixture with the zinc oxide powder. This corresponds, at a ratio of 3–1 by weight powder/liquid, to an overall weight concentration of only 2.5%. Therefore, in view of this limiting characteristic of the amount of polymer that can be incorporated into the zinc oxide/eugenol mixture by the solution procedure of this reported literature, only a very slight improvement in the compressive strength characteristics of the composition can be realized. This slight improvement has been offset by the poor mixing and placement procedures that accompany this process, and thus this process also has not been satisfactorily adopted by the dental industry.

Exemplary compositions employing a low molecular weight soluble polymer together with zinc oxide and engenol are illustrated for example in U.S. Patent 2,413,-294 to Curtis. Thus, this patent illustrates that cementitious preparations can be prepared by providing a solution of zinc oxide and a low molecular weight soluble polymer in the liquid eugenol, the solution being generally prepared by dissolving the polymer in eugenol and subsequent addition of zinc oxide or by heating the mixture of powders with the liquid material. Again, however, as with other attempts to modify the zinc oxide-eugenol system such compositions as illustrated in U.S. Patent 2,413,-294 have not been found satisfactory for most purposes since they are quite limited in the amount of polymeric material that can be added. Here again, therefore, the requirement that the polymer be soluble in liquid eugenol, thereby limiting the applicability of only low molecular weight soluble polymer does not allow for the preparation of wholly satisfactory products.

It has now been discovered that it is possible to produce a polymer-zinc oxide-eugenol mixture suitable as a base and temporary dental filling or a temporary dental cement by incorporation of a finely divided polymer-zinc oxide mixture into eugenol. Such a procedure allows for the incorporation of a great quantity of the polymer into the system with accompanying increase in compression strength and other desirable characteristics without the limiting disadvantages of both restrictive solubility requirements and poor mixing.

Additionally, it has been found in accordance with the present invention that an unexpected improvement in the properties of the dental cement or dental filling prepared from a polymer-zinc oxide-eugenol mixture, particularly the compressive strength characteristics of such a composition, can be had by utilizing in lieu of conventional zinc oxide a zinc oxide material which has been surface treated with an aliphatic or aromatic carboxylic acid, preferably a lower aliphatic monocarboxylic acid.

It is, therefore, a principal object of the present invention to provide a composition useful as both a temporary dental cement and temporary dental filling and a process for producing such composition, which composition and process are free from the inherent deficiencies of those of the prior art.

It is yet a further object of the present invention to provide a zinc oxide-eugenol mixture useful as both a temporary dental cement and temporary dental filling material and a process for producing such composition, which process produces a composition having a combination of physical properties superior to those produced by prior art methods.

It is still a further object of the present invention to provide a composition comprising eugenol and a finely divided powder comprising zinc oxide and a high molecular weight polymer which composition can be mixed by conventional dental techniques to form a homogeneous temporary dental cement or filling.

It is yet a further object of the present invention to provide a temporary cement and temporary dental filling composition which comprises a mixture of zinc oxide and a finely divided high molecular weight polymer in eugenol, such polymer being substantially insoluble in the liquid eugenol.

It is yet a further object of the present invention to provide a novel temporary dental filling or temporary dental cement composition having an unexpectedly increased compressive strength associated with the employment of a surface treated zinc oxide together with a polymeric component in liquid eugenol.

It is yet a further object of the present invention to provide such a novel temporary dental filling or temporary dental cement composition wherein said surface treated zinc oxide comprises zinc oxide in which the surface is treated with an aliphatic or aromatic carboxylic acid, preferably a lower aliphatic monocarboxylic acid.

It is still a further object of the present invention to provide a process for the preparation of a temporary cement and temporary filling material which comprises mixing finely divided powdered zinc oxide and a finely subdivided high polymer with subsequent mixture of the powdered blend in eugenol.

Still further objects and advantages of the composition and process of the present invention will become more apparent from the following more detailed description of the invention.

In accordance with the present invention, it has been found possible to considerably increase the compression strength and produce superior resistance to the effects of the oral environment by the addition to powdered zinc oxide finely subdivided high molecular weight polymers. The intimate mixture produced by blending the powdered ingredients is then mixed with eugenol in accordance with well established techniques of dental practice. The addition of the high molecular weight polymer substance by this method allows a considerable volume concentration of the high molecular weight polymeric materials to be employed, and the resulting hardened composite of excess zinc oxide, zinc eugenolate, high molecular weight polymeric material, and excess eugenol has considerable utility and durability in the oral environment.

It has also been found in accordance with the present invention that unexpectedly superior temporary dental filling and temporary dental cements in accordance with the present invention can be prepared by employing in lieu of conventional zinc oxide a zinc oxide material of which the surface has been treated with an aliphatic or aromatic carboxylic acid, preferably a lower aliphatic monocarboxylic acid, e.g., propionic acid.

Contrary to prior art teachings in which it was found possible only to incorporate up to 10%–15% low molecular weight polymeric material into the eugenol because of the problem of solubility and the difficulty of mixing when the viscosity of the solution of polymer in the eugenol is mixed with the zinc oxide, by the process of the present invention it has been found possible to incorporate the finely divided polymeric material in extremely high concentrations. In general, the zinc oxide of the zinc oxide eugenol mixture is replaced with from about 5% by weight up to a maximum of about 75% by weight, depending on the form and composition of the polymer of the finely divided polymeric material.

This lower limit represents the smallest amount which desirably affects the compression characteristics of the zinc oxide-eugenol mixture while the upper limit of about 75% would appear to represent the maximum amount that can be incorporated while still eliminating the difficulty in the mixing of the powder and liquid eugenol. A range of about 20% to about 40% by weight replacement of the zinc oxide by the subdivided polymer is preferred. This 40% by weight corresponds to a volume concentration of up to 37% when the powder of the present invention is mixed with eugenol in a ratio of 2 grams per 1 cc. or up to 53 volume percent at a ratio of 4 grams of powder to 1 cc. of eugenol. In general, the ratio of powdered mixture to eugenol varies from about 1 gram to 1 cc. to about 5 grams to 1 cc. although greater or smaller ratios can be advantageously employed if desired.

Different, superior and unusual variation in mechanical properties particularly are consequently obtained without modifying the chemical reaction by which the zinc eugenolate is formed. It is also an advantage of the present invention that the mixing and placement techniques of the dentist that utilizes the temporary cement or temporary filling composition of the present invention need not be altered to successfully use this material.

It is also of further importance that the choice of polymers of the present invention are not limited to the low molecular weight soluble polymers that had to be previously employed when a solution of eugenol and the polymer was utilized in an attempt to increase the strength of composite mixtures. Thus, for example, the polymers of the present invention can range from the fairly low molecular weight soluble polymers to the vary high molecular weight and even cross-linked polymers which are not at all soluble in liquid eugenol. In accordance with the present invention the high molecular weight polymeric materials, especially those which are insoluble or substantially insoluble in the liquid eugenol are preferred. Such polymeric materials are generally those which have a molecular weight of about 50,000 to about 500,000. Thus, for example, suitable polymeric materials include the vinyl resins such as polyvinylchloride or polyvinyl acetate, polystyrene, the acrylate resins such as polyacrylate and polymethacrylate and polymerized hydrocarbons such as polyethylene and polypropylene, various polymerized cellulose derivatives, polyethers, polycarbonates, polyesters and various other equivalent polymeric materials.

It is also within the scope of the present invention to employ various copolymers such as copolymers of polyvinylchloride and vinylidenechloride, copolymers of polyvinylchloride and maleic anhydride, etc.

Similarly, the polymers of the present invention can be of the cross-linked variety, such as obtained by the copolymerization of a material such as ethyleneglycoldimethacrylate. While as stated previously, fairly low molecular weight polymers can be employed in the process and composition of the present invention, it has been found advantageous to utilize the higher molecular weight materials since these materials present greater resistance to abrasion and wear. The only requirement for the use of the polymer of the present invention is that the eugenol and the polymer preferably have an affinity for each other. In other words, any polymer can be employed which will form a composite mass with eugenol and zinc oxide. Where it is desired to employ a finely subdivided polymer that has no affinity for eugenol and zinc oxide, it is possible to coat or treat the surface of the polymer with a surface active or binding agent so as to increase the affinity of the ingredients.

With respect to the degree of subdivision of the polymers of the present invention, the only limiting requirement is that set by the application for which the material is being prepared. Thus, for example, The American Dental Association has set forth the standard that the fillers of a dental filling cement must be 40 microns or less in diameter to be employed. Aside from such upper limit with respect to this utility, however, no upper limit of degree of subdivision has been found to exist.

It is often advantageous to employ a degree of subdivision of the polymer which closely corresponds to that of the zinc oxide that is conventionally employed in these zinc oxide-eugenol mixtures. Therefore, a degree of subdivision of 10 microns or less is desired. It has been found that there is no lower limit with respect to the degree of subdivision of the polymer materials and zinc oxide of the present invention since advantageous properties have been produced with the finest degree of subdivision that has been found possible.

In accordance with the process of the present invention, the zinc oxide and subdivided polymeric materials are mixed so as to produce a disperse mass comprising the two powdered ingredients. This disperse mass is then mixed with the liquid eugenol by conventional dental methods.

In addition to the zinc oxide, polymeric materials, and eugenol, it has been found advantageous to include and distribute within the mass reinforcing fibers to distribute the applied load over the entire filling when the composition of the present invention is employed as a temporary filling material. By the incorporation of such fibers in the mass, the filling can be removed from the tooth in a very few large pieces rather than in pulverate form. Suitable fibers that can be employed in conjunction with the zinc oxide, polymer and eugenol of the present invention include fibers of asbestos, glass, nylon, etc.

It is also within the scope of the present invention to modify the basic compounds by the inclusion of minerals, fillers, or plasticizers. Typical of the general fillers are silica, glass beads, titanium dioxide, calcium sulfate, dicalcium phosphate, etc. Suitable plasticizers include, for example, olive oil, mineral oil, dibutyl phthalate, etc.

It also has been discovered in accordance with the present invention that unexpectedly superior compositions, particularly with regard to compressive strength, can be prepared by utilizing in lieu of the conventional zinc oxide a zinc oxide material, the surface of which has been treated with an aliphatic or aromatic carboxylic acid. The aliphatic or aromatic carboxylic acids which can be employed in the surface treatment of the zinc oxide utilized in accordance with this embodiment of the present invention are generally those aliphatic monocarboxylic acids, both saturated and unsaturated, which contain up to about 16 carbon atoms, while the aromatic carboxylic acids generally comprise benzoic acid and substituted benzoic acids. Preferably the acid component employed in the surface treatment of the zinc oxide is a lower aliphatic monocarboxylic acid containing from about 1 to about 8 carbon atoms, propionic acid being a preferred acid employed in accordance with the present invention.

Exemplary acids which can be employed in accordance with this embodiment of the present invention include:

formic acid
    acetic acid
    propionic acid
    n-butyric acid
    isobutyric acid
    n-valeric acid
    trimethylacetic acid
    caproic acid
    n-heptylic acid
    caprylic acid
    pelargonic
    lauric acid
    myristic acid
    palmitic acid
    acrylic acid
    methacrylic acid
    vinylacetic acid
    decylenic acid
    undecylenic acid
    dodecylenic acid
    palmitic acid
Aromatic
    benzoic acid
    lower alkyl substituted benzoic acids
    p-methyl benzoic acid
    o-methyl benzoic acid
    o-propyl benzoic acid
    o-t-butyl benzoic acid
lower alkoxy substituted benzoic acid
    o-methoxy benzoic acid
    o-ethoxy benzoic acid
    o-butoxy benzoic acid
halogen substituted benzoic acid
    o-chloro benzoic acid
    o-bromo benzoic acid The treatment of the zinc oxide with the acid generally involves a process by which the zinc oxide is reacted with the hot vapors of acid, e.g., propionic acid, forming a zinc salt, zinc propionate, on the surface of the zinc oxide particles. Thus, for example, U.S. Patent 2,303,330 teaches such a process for treating a zinc oxide material to modify the characteristics thereof and facilitate the incorporation of the same into rubber. In addition to the treatment of the zinc oxide with hot vapors of the acid, it is of course possible to treat the zinc oxide material in a number of different ways. Thus, for example, it is possible to provide the necessary coating over the surface of the zinc oxide by reacting zinc oxide with the acid in a suitable solvent, e.g., a lower alcoholic solvent such as methanol or with the liquid acid itself when the acid is in the form of a liquid under normal conditions.

As indicated previously any of the aforementioned acids can be employed to provide a surface treatment for the zinc oxide employed in accordance with this embodiment of the present invention, the use of any such acids providing a composition which has an unexpectedly compressive strength.

Thus, as will be pointed out later in relation to the specific examples, the use of the surface treated zinc oxide provides for a product of a compressive strength far greater than the use of the zinc oxide absent such surface treatment. Moreover, it has been discovered in accordance with the present invention that the use of the surface treated zinc oxide alone without the addition of finely divided polymeric materials does not provide a dental filling or dental cement composition of enhanced characteristics but that it is the combination of the surface treated zinc oxide and finely divided high molecular weight polymeric material in eugenol which provides for a product having an unexpectedly high compressive strength as well as a high abrasive resistance and resistance to the fluids in the oral environment.

The composition and process of the present invention will now be described with reference to the following specific examples. It is to be understood that these examples are for purposes of illustration only and the invention is in no way to be deemed as limitative thereto.

and high polymer produced in accordance with the findings of the present invention have improved compressive strength compared with zinc oxide and eugenol alone. Used at a ratio of two parts of powder to one part of liquid the consistency of these examples is suitable for general cementation procedures.

TABLE I.—COMPOSITION

| | Powder, grams; liquid, cc. | Weight percent Polymer in— | | Polymer in volume percent Polymer in— | | Volume percent Polymer in finished specimen | Compressive strength, strain rate 0.1 in./min., p.s.i. |
|---|---|---|---|---|---|---|---|
| | | Powder | Liquid | Powder | Liquid | | |
| Example No.: | | | | | | | |
| 1 | 2/1 | 0 | 0 | 0 | 0 | 0 | 2,200 |
| 2 | 2/1 | 5 | 0 | 23 | 0 | 7 | 3,600 |
| 3 | 2/1 | 20 | 0 | 58 | 0 | 24 | 5,400 |
| 4 | 2/1 | 30 | 0 | 71 | 0 | 32 | 7,000 |
| 5 | 2/1 | 0 | 10 | 0 | 10 | 7.4 | 4,500 |

EXAMPLE 1

Five (5) parts by weight of powdered zinc stearate were intimately mixed with 95 parts by weight of zinc oxide with an average particle diameter of 0.14 micron. The resulting powder was mixed with eugenol containing 1.0% glacial acetic acid which acted as a catalyst. The mixture was made on a parchment pad, using a spatula, in accordance with dental procedure.

EXAMPLE 2

Five (5) parts by weight of a finely subdivided polymethylmethacrylate, having an average particle diameter of less than 2 microns, and an intrinsic viscosity in benzene of 2.0 were intimately mixed with 95 parts by weight of the zinc oxide used in Example 1. The resulting powder blend was mixed with eugenol containing 1% glacial acetic acid as in Example 1.

EXAMPLE 3

Twenty (20) parts by weight of the same polymethylmethacrylate used in Example 2 were blended with 80 parts by weight of the zinc oxide used in previous examples. The resulting powder was likewise mixed with eugenol containing 1.0% glacial acetic acid.

EXAMPLE 4

Thirty (30) parts by weight of the same polymethylmethacrylate used in previous examples were blended with 70 parts by weight of the zinc oxide used in previous examples. The resulting powder was mixed with eugenol containing 1.0% glacial acetic acid.

EXAMPLE 5

The powder blend of Example 1 was mixed with a solution consisting of 10 parts polystyrene (Dow Chemical Co., Styron 690) and 90 parts eugenol to which had been added 1.0% glacial acetic acid as a catalyst. The eugenol solution had a viscosity of 800 centipoises at 70° F. This example represents the highest practical concentration of styrene in eugenol considered by the prior art.

Table 1 summarizes compressive strength data for these examples as a function of the volume percent of powder in the finished specimen. This value was calculated using a density of 5.6 for zinc oxide, and 1.0 for both the eugenol and polymer.

The composites of zinc oxide, eugenol, zinc eugenolate

It is significant that when used at higher powder/liquid ratios the compounds of this invention possess greater volume percentages of polymer, and this permits greater reinforcement of the composite structure. This is in contrast to solutions of polymer and eugenol which when mixed with greater amounts of powder produce compositions with decreasing percentages of polymer in the finished specimen.

In order to utilize the compositions as filling materials etc., ratios higher in powder, i.e., three or four parts to one part of liquid, are required. It is this application which requires greater compressive strength in order to resist the forces of mastication.

TABLE II.—COMPOSITION

| | Powder, grams; liquid, cc. | Weight percent Polymer in— | | Polymer in volume percent Polymer in— | | Volume percent Polymer in finished specimen | Compressive strength, strain rate 0.1 in./min., p.s.i. |
|---|---|---|---|---|---|---|---|
| | | Powder | Liquid | Powder | Liquid | | |
| Example No.: | | | | | | | |
| 1 | 3/1 | 0 | 0 | 0 | 0 | 0 | 2,600 |
| 3 | 3/1 | 20 | 0 | 58 | 0 | 43 | 6,300 |
| 3 | 4/1 | 20 | 0 | 58 | 0 | 46 | 6,800 |
| 5 | 3/1 | 0 | 10 | 0 | 15 | 9.8 | 5,300 |

Significant improvements in abrasion resistance are also realized by the teaching of this invention. The following technic was devised to determine this property.

A laboratory Tabor Abrasor was modified by drilling a hole 2.5 inches from its arm's fulcrum, approximately 6.1 mm. in diameter. Into this were placed specimens 6.0 mm. in diameter and 12.0 mm. long. The specimen thus contacts a revolving plate unmodified except that sandpaper discs were cut to cover it. These discs were cut from number 20 production grade sandpaper.

The coarse paper avoided packing with zinc oxide and eugenol compound, which fact makes finer abrasive papers unusable in a short period of time. Different sheets of paper remove varying quantities of material, but correlation has been found between the relative volume percent lost during abrasion. Thus, a single material can serve as a control, and abraded loss can be determined relative to a control material. Calculation of Relative Abrasion is then made by dividing the volume percent abraded loss of the unknown materials by the volume percent abraded loss of the control material. Greater values for Relative Abrasion mean greater losses of material, compared to the composition of Example 3.

TABLE III

| | Percent polymer by weight | | Powder/ liquid | Relative Abrasion |
|---|---|---|---|---|
| | Powder | Liquid | | |
| Example No.: | | | | |
| 1 | 0 | 0 | 2/1 | 1.77 |
| 5 | 0 | 10 | 2/1 | 1.45 |
| 3 | 20 | 0 | 2/1 | 1.0 |
| 3 | 20 | 0 | 3/1 | 1.0 |

EXAMPLES 6-13

The compositions of the present invention do not rely on their complete solubility in eugenol to be effective. Finely subdivided polymers which are insoluble may be employed. For example, polymers of polymethylmethacrylate were prepared by copolymerizing with minor amounts of ethylene glycol dimethacrylate. The resulting cross-linked polymers vary in their solubility in eugenol. Some are quite insoluble. Nonetheless, when they were blended with the zinc oxide used in previous examples, the reinforcements which resulted were effective, and superior mechanical properties persisted.

Table IV illustrates this. In each case twenty (20) parts weight of the powdered, cross-linked polymethylmethacrylate defined in the table were mixed with the same zinc oxide used in previous examples. This intimate mixture was then combined with eugenol containing 1.0% acetic acid according to dental procedure.

In all cases the powder/liquid ratio of Examples 6 to 13 inclusive was 2-1.

In order to illustrate the decreasing solubility of the polymers in eugenol as a result of increasing cross-linking concentration, viscosities were obtained. Viscosities of a 10% solution of the polymer minus the viscosity of the eugenol alone were divided by the viscosity of eugenol alone to provide the specific viscosity in eugenol. Lesser values for "Specific viscosity" indicate less solubility for these polymers, prepared in a series, all by the same technique, and of high molecular weight.

TABLE IV

| | Percent cross-linked (EDMA) | Specific viscosity in eugenol | Compressive p.s.i. strain rate 0.1 in./min. |
|---|---|---|---|
| Example No.: | | | |
| 6 | 0.001 | 1,510 | 51980 |
| 7 | 0.003 | 1.579 | 5,700 |
| 8 | 0.01 | 1,503 | 6,400 |
| 9 | 0.03 | 1,492 | 5,900 |
| 10 | 0.1 | 282 | 6,300 |
| 11 | 0.3 | 136 | 6,100 |
| 12 | 1.0 | 12 | 6,100 |
| 13 | 0 | 679 | 6,000 |

Another example of a polymer with solubility characteristics which preclude its use in solutions with eugenol, is isotactic polystyrene. A 5% solution in eugenol, prepared by stirring at elevated temperature overnight, had formed a gel. Mixtures of this gel and zinc oxide powder were nearly impossible, and quite impractical. The finely subdivided polymer alone was intimately mixed with the zinc oxide. The resulting blend of powders was mixed with eugenol, producing a quite satisfactory cementing media, and showed improved mechanical properties.

EXAMPLE 14

Twenty (20) parts of the high molecular weight isotactic polystyrene with an average particle diameter of less than one micron were mixed with 80 parts by weight of the zinc oxide used in previous examples. Mixtures were made of this powder blend with a solution of eugenol containing 1.0% acetic acid added as a catalyst. Specimens so prepared and stored for 7 days in water at 37° C. had a compressive strength of 6200 p.s.i. when tested at a strain rate of 0.1 inch per minute.

Other polymers of different solubility characteristics were also found suitable in these applications. These include polyvinylchloride, polyethylene, polystyrene, polyacrylic acid, and polymethacrylic acid and polymerized esters of these acids polyesters of vinyl alcohol, cellulose derivatives, polyethers polyesters, polycarbonates, etc., and interpolymers of these.

EXAMPLES 15-20

Ilustrative of polymers which have application are the examples of Table V. The powders used are mixtures of 20 grams of the indicated polymer with 80 grams of the zinc oxide used in previous examples. After dispersion, the resulting powder mixture was combined with a solution of 1.0% acetic acid in eugenol at a powder liquid ratio of 2-1 by weight.

TABLE V

| Example No. | Polymer type | Specific viscosity of polymer in eugenol | Compressive strength, 0.1 in./min. strain rate p.s.i. |
|---|---|---|---|
| 15 | Polyvinylchloride, QYNV, Union Carbide Plastics Co. | 25 | 5,200 |
| 16 | Polyvinylchloride/maleic anhydride VMCH, Union Carbide Plastics, Co. | 584 | 5,000 |
| 17 | Polyvinylchloride/polyvinylacetate, VYNW-5, Union Carbide Plastics Co. | 75 | 6,100 |
| 18 | Polyvinylchloride/vinylidine chloride, Geon 205, Goodrich Chemical Co. | 852 | 5,500 |
| 19 | 75 methylmethacrylate/ethylmethylmethacrylate. | 728 | 6,000 |
| 20 | Polystyrene, Stron 690, precipitated, Dow Chemical. | 800 | 6,000 |

Unusually high compressive strengths have been realized using certain co-polymers, as illustrated by the following examples.

EXAMPLE 21

Thirty (30) parts by weight of polymethylmethacrylate cross-linked with 0.10 percent ethylene glycol dimethacrylate, the same polymer used previously in Example 10, were mixed with 70 parts by weight of the zinc oxide used previously. The powder so prepared was mixed at a powder/liquid ratio of 2.0 grams to 1.0 cc. of eugenol containing 1.0% acetic acid as a catalyst. After seven days in water, cylinders of this cement material had a compressive strength of 8400 p.s.i.

EXAMPLE 22

Forty (40) parts by weight of the same polymer and sixty (60) parts by weight of the zinc oxide used above in Example 21 were blended. The resultant dispersion was mixed at a ratio of 2.0 grams to 1.0 cc. of eugenol containing 1.0% acetic acid. Cylinders stored 7 days in water at 37° C. had a compressive strength of 9500 p.s.i.

EXAMPLES 23-28

In addition to realizing high compressive strengths by the use of certain polymers, other variations are possible. One can vary the toughness of the composite by appropriate selection of high polymers. Uniquely different structures are thereby obtained.

To illustrate this, the area under a compressive stress-strain curve was measured in inch-pounds. Values for several different compositions are tabulated, which clearly show the advantages of the composite structures of this invention.

Compressive tests were conducted on a 6.0 x 12.0 mm. specimen at a strain rate of 0.1 inch per minute after having been stored in water at 37° C. for 1 week:

| Type | Absorbed energy, inch-pounds/inch | Compressive strength, p.s.i. |
|---|---|---|
| Example: | | |
| 22 Composite | 240 | 9,500 |
| 23 do | 340 | 5,200 |
| 24 Prior art | 50 | 4,500 |
| 25 Control | 27 | 2,600 |

EXAMPLE 23

Twenty (20) parts by weight of a copolymer, prepared from 50 parts ethyl methacrylate and 50 parts methyl methacrylate, having a particle size less than two microns were intimately mixed with eighty (80) parts by weight of the zinc oxide used previously. The resulting powder was mixed at a ratio of 3.0 grams to 1.0 cc. of eugenol containing 1.0% acetic acid.

EXAMPLE 24

The zinc oxide used in previous examples was mixed at a ratio of 2.0 grams to 1.0 gram of a solution of 10 parts polystyrene, (Dow Chemical Co., Styron 690) and 90 parts eugenol to which has been added 1.0% acetic acid.

EXAMPLE 25

The powder of Example 1 was mixed at a powder/liquid ratio of 3.0 grams to 1.0 cc. of eugenol containing 1.0% acetic acid.

EXAMPLES 26–29

The toughness of the composites of the present invention was varied by varying the concentration of high polymers. Absorbed energy values illustrate the situation. These tests were conducted at a strain rate of 0.2 inch per minute after having been stored in water at 37° C. for one week.

| Example No.: | Weight percent polymer in powder | Absorbed energy, inch-pounds/inch | Compressive strength, p.s.i. |
|---|---|---|---|
| 26 | 0 | 27 | 2,600 |
| 27 | 20 | 100 | 5,500 |
| 28 | 50 | 244 | 7,121 |
| 29 | 65 | 1,253 | 5,850 |

Examples 26 through 29 were prepared by blending appropriate concentrations of the polymethylmethacrylate used in Example 2 with the zinc oxide used in the same example. The powders prepared in this manner were blended at a ratio of 2.0 grams to 1.0 cc. of eugenol containing 1.0% acetic acid as a catalyst.

EXAMPLE 30

A dispersion is made, using a food blender, of 2.5 grams of milled glass fibers $\frac{1}{16}$ inch long, and 100 grams of a blended powder of Example 3.

The resulting dispersion was mixed at a powder/liquid ratio of 1.0 gram of powder to 0.3 gram liquid. Specimens so prepared and stored for 7 days at 37° C. in water had a compressive strength of 6900 p.s.i. when tested at a strain rate of 0.1 inch per minute.

EXAMPLE 31

A dispersion of 6.0 grams of flocked nylon fiber was added to 100 grams of the blended powder of Example 3. The resulting dispersion was mixed at a powder/liquid ratio of 4/1 with eugenol containing 1.0% acetic acid as a catalyst. The composition had a compressive strength of 7900 p.s.i. at a strain rate of 0.2 in./min.; and 2100 p.s.i. at a 20 in./min. strain rate. It had an impact strength 2.5 times that of the material before fibers were added.

EXAMPLE 32

Twenty (20) percent by weight of glass beads screened through a 325 mesh sieve were added to the powder of Example 3. This dispersion was then mixed at a ratio of 4.0 grams to 1.0 cc. of eugenol containing 1.0% acetic acid. Specimens had compressive strengths of 6100 p.s.i. after being stored at 37° C. in water for seven days.

The following examples illustrate a preferred embodiment of the present invention, i.e., the preparation of temporary dental cement and temporary dental filling compositions wherein the zinc oxide is surface treated. In accordance with this embodiment of the present invention exemplified below the acid employed to treat the surface of the zinc oxide need only be employed in an amount to form a monomolecular layer on the surface of the particulate material. Thus, for example, based on the weight of the total composition the acid employed for the surface treatment may be employed in an amount of from about 0.1% or less up to about 10%, optimum concentrations of the acid being about 0.5% to 3.0% by weight.

As will be shown by the following example the use of the surface treated zinc oxide in accordance with this preferred embodiment of the present invention provides an enhanced effect, particularly with respect to compressive strength, which effect could not be anticipated from the individual components alone or any combination of the same other than the necessary combination of the surface treated zinc oxide, polymeric material, and eugenol.

EXAMPLE 33

(A) 20 parts of a finely divided polymethyl methacrylate having an average particle diameter of less than 2 microns, and an intrinsic viscosity in benzene of 2.0, were intimately blended with 80 parts by weight of a lead free zinc oxide made by the French process with a mean particle size of 0.14 microns.

(B) 20 parts by weight of the same methacrylate were intimately blended with 80 parts by weight of a lead-free zinc oxide made by the French process with a mean particle size of 0.11 microns but treated with 0.5% propionic acid in accordance with U.S. 2,303,330.

Both powders were mixed with eugenol containing 1.23% acetic acid as a catalyst at a powder/liquid ratio of 3:1. Table VI below illustrates the results of the compressive strength of the two compositions.

TABLE VI

| | Powder/liquid | Compressive strength |
|---|---|---|
| Composition: | | |
| (A) | 3:1 | 6,300 |
| (B) | 3:1 | 8,300 |

[1] 0.1 in/min. strain rate.

To illustrate that the surface treated zinc oxide alone does not contribute to the increased mechanical properties absent the presence of the polymeric material, the following experiment was conducted:

The same treated zinc oxide was mixed with eugenol containing 1.25% acetic acid as a catalyst at a powder/liquid ratio of 3:1. A compressive strength of 2500 p.s.i. at a strain rate of 0.1 inch per minute was found. A composition of zinc oxide and eugenol has a compressive strength between 2000 and 3500 p.s.i.

This lack of an increase in the compressive strength of the composition indicates that the use of surface treated zinc oxide with eugenol does not provide the outstanding mechanical properties but as shown above such unexpected properties reside only in the combination of the surface treated zinc oxide polymeric material and eugenol.

In order to illustrate that the mere admixture of zinc propionate, the reaction product between propionic acid and zinc oxide, does not contribute to improved mechanical characteristics when added to a composition of polymeric material, zinc oxide, and eugenol, the following experiment was conducted:

3.5% zinc propionate was dispersed with the powder of A above. The compressive strength was 6600 p.s.i. at powder/liquid ratio of 3:1, tested at strain rate of 0.1 inch per minute. Additions of zinc propionate alone are, therefore, not effective since the same composition without zinc propionate present had a compressive strength of 6300 p.s.i.

The following experiment was conducted to illustrate that propionic acid itself is not effective in increasing the mechanical properties of a zinc oxide-eugenol composition containing the polymeric material. Propionic acid was dissolved in eugenol containing 1% acetic acid as a catalyst. The liquid compositions were mixed with the powder of A above in a ratio of 4 parts by weight of the power per one part liquid. The results of compression strength tests of the composition so produced are shown in Table VII, below.

TABLE VII

|  | Powder/liquid | Compressive strength, p.s.i.[1] |
|---|---|---|
| Percent propionic acid added to liquid: |  |  |
| 0 | 4:1 | 6,800 |
| 0.5 | 4:1 | 3,600 |
| 1.0 | 4:1 | 4,600 |
| 3.0 | 4:1 | 3,800 |

[1] 0.1 in./min. strain rate.

From the above it can be seen that the compressive strength of the resulting composition was not increased by the addition of propionic acid but in fact the compressive strength was greatly reduced when compared in composition in which the propionic acid was not added.

EXAMPLE 34

The use of surface treated zinc oxide permits relatively greater powder/liquid ratios to be used in preparations for a given application. This is shown by reference to a modification of ADA specification number 8, a measure of the consistency of a composition.

In this test, 0.5 ml. of cement mix was placed between glass plates with a static load of 120 grams, applied 2 minutes after the beginning of the mix. After 8 minutes the diameter of the circle of cement formed between the plates was measured. The greater the number in millimeters the less is the consistency of the mix.

TABLE III

|  | Powder/liquid | Consistency, mm. | Compressive strength, p.s.i.[1] |
|---|---|---|---|
| Composition: |  |  |  |
| (1) | 2:1 | 20 | 5,800 |
| (2) | 3:1 | 20 | 8,300 |

[1] 0.1 in./min. strain rate.

It is clear from the above that at powder/liquid ratios suitable for actual use the compositions of the present invention employing the surface treated zinc oxide have the advantage of a much greater compressive strength.

Whereas a maximum of about 3.3 grams of Composition (1) containing non-treated powder can be mixed with 1 gram of liquid eugenol, a maximum of about 6.3 grams of Composition (2) containing treated zinc oxide may be used.

The lack of any increase in the solubility of disintegration of the composition employing the surface treated zinc oxide is shown in the following table.

TABLE IX

|  | Powder/liquid | Strain rate | Compressive strength | Disintegration, percent[1] |
|---|---|---|---|---|
| Composition: |  |  |  |  |
| (1) | 3:1 | 0.02 | 5,400 | 0.10–0.16 |
|  | 3:1 | 0.2 | 6,360 |  |
|  | 3:1 | 2.0 | 7,300 |  |
| (2) | 6:1 | 0.02 | 10,350 | 0.10–0.16 |
|  | 6:1 | 0.2 | 11,590 |  |
|  | 6:1 | 2.0 | 12,510 |  |

[1] 7 days—ADA Spec. #8.

The higher powder/liquid ratios and compressive strengths without any increase in solubility or disintegration of a composition in accordance with this preferred embodiment of the present invention make the same particularly valuable as restorative materials and such materials have proven highly successful in posterior portions of the mouth for periods of one to two years or more. Accordingly, while the compositions of the present invention are primarily useful as temporary dental cement and temporary dental filling materials there is some degree of pertinency associated with the preferred composition of the present invention.

EXAMPLE 35

When Composition B of Example 33 is repeated except that the polymethyl methacrylate is replaced with an equal amount of the following finely divided polymeric materials substantially equivalent results are obtained:

(A) Polystyrene (Dow Chemical Co., Styron 690)
(B) Isotactic polystyrene
(C) Polyvinylchloride, QYNV, Union Carbide Plastics Co.
(D) Polyvinylchloride/polyvinylacetate, VYNW-5, Union Carbide Plastics, Co.
(E) 75 methylmethacrylate/ethylmethylmethacrylate

EXAMPLE 36

When the preparation of Composition B of Example 33 is again repeated except that the lead-free zinc oxide with a mean particle size of 0.11 micron is treated with the following acid substantially equivalent results are obtained:

(A) n-valeric acid
(B) caproic acid
(C) lauric acid
(D) vinylacetic acid
(E) undecylenic acid
(F) benzoic acid
(G) o-ethoxy benzoic acid
(H) o-methyl benzoic acid
(I) o-chlorobenzoic acid As indicated previously the present invention provides a substantial improvement in the preparation of temporary dental fillings and temporary dental cements of compositions containing zinc oxide and eugenol. Thus, in accordance with the present invention by providing a dispersion of a mixture of solids, a composition of improved mechanical characteristics is so found by allowing the inclusion of higher amounts of a finely divided polymeric material.

In addition, the process and composition of the present invention, since not dependent upon the solubility of the polymeric material can advantageously employ polymers, including cross-linked polymers of high molecular weight, such polymers being substantially insoluble or insoluble in the liquid eugenol. This allows for the production of temporary dental cements and temporary dental fillings which have increased resistance to abrasion and superior mechanical properties.

In addition, in accordance with the preferred embodiment of the present invention, it has been discovered that the compressive strength of the composition of the present invention, as well as the tensile strength and other physical characteristics can be unexpectedly improved by the employment of a surface treated zinc oxide together with the finely divided polymeric material in a dispersion of eugenol. As shown previously, the results of compressive strength and other physical properties associated with the employment of the acid treated zinc oxide in accordance with the present invention cannot be predicted from the individual components themselves or any combination of the same except for the essential three component composition of the present invention, that is, the surface treated zinc oxide, finely divided polymeric material, and liquid eugenol.

The ability of the compositions of the present invention to possess unexpectedly higher compressive strength and other physical characteristics makes them exceptionally suitable for a variety of dental applications. Thus, for example, because of the low apparent consistency of the compositions based upon the surface treated zinc oxide such compositions are particularly adapted for the cementation of a rigid dental appliance to a tooth. Such application requires a material of a low apparent consistency so that all excess cement can be expressed from between the appliance and the tooth when the appliance is slated.

In addition, because of the ability to employ higher percentages of the powder material, i.e., the surface treated zinc oxide and polymer, such compositions in accordance with the preferred embodiment of the present invention have exceptional value in the preparation of restorative materials, particularly for use in posterior portions of the mouth.

While most of the exemplary material presented above has been presented to illustrate the unexpected improvement of the compressive strength of the compositions of the present invention it is important to point out that tensile strength and other physical characteristics are enhanced in compositions within the scope of the present invention.

While the present invention has been described primarily in relation to the employment of polymers and systems comprising zinc oxide and eugenol, the invention can also be employed to incorporate compression strength materials in other hardening systems useful for temporary fillings and cement compositions. Thus for example mixtures of zinc oxide and substituted benzoic acids or other ortho substituted phenols such as isoeugenol, guaiacol and methylguaiacol also harden to produce dental cement type materials. In this respect the present invention, in which a subdivided polymeric material is incorporated into the zinc oxide powder prior to admixture with the liquid agent, is applicable to such hardening systems.

What is claimed is:

1. A temporary dental cement or filling composition which comprises a disperse mixture of (a) liquid eugenol and (b) a powder phase comprising surface treated zinc oxide and a polymeric material having a molecular weight within the range of 50,000 to 500,000 and selected from polyolefins, polyacrylates and polymethacrylates, said powder phase comprising particles of a maximum diameter of 40 microns, said polymeric material comprising from about 5.0 to about 75.0% by weight of said powder phase, said powder phase being employed in an amount of from about 1 to 5 grams per 1 cc. of eugenol, said surface treated zinc oxide being prepared by contacting zinc oxide with hot propionic acid vapors to form at least a monomolecular layer of zinc propionate on the zinc oxide particles.

2. The composition of claim 1 wherein said polymeric material comprises from 20.0 to 40.0% by weight of said powder phase.

3. The composition of claim 1 wherein said polymeric material comprises a polyacrylate or polymethacrylate.

References Cited

UNITED STATES PATENTS

| | | | |
|---|---|---|---|
| 2,413,294 | 12/1946 | Curtis | 106—35 X |
| 2,936,242 | 5/1960 | Brauer | 106—35 |
| 2,937,099 | 5/1960 | Kutscher | 106—35 |
| 3,028,247 | 4/1962 | Molnar | 106—35 |

JULIUS FROME, Primary Examiner

J. H. MILLER, Assistant Examiner

U.S. Cl. X.R.

106—35; 32—15